(12) United States Patent
Hilgenberg

(10) Patent No.: US 10,006,483 B2
(45) Date of Patent: Jun. 26, 2018

(54) BOTTOM BRACKET HAVING AN EXPANDABLE RESILIENT RING

(71) Applicant: Praxis Works LLC, Santa Cruz, CA (US)

(72) Inventor: William A. Hilgenberg, Santa Cruz, CA (US)

(73) Assignee: Praxis Works LLC, Santa Cruz, CA (US)

( * ) Notice: Subject to any disclaimer, the term of this patent is extended or adjusted under 35 U.S.C. 154(b) by 0 days. days.

(21) Appl. No.: 15/499,562

(22) Filed: Apr. 27, 2017

(65) Prior Publication Data

US 2017/0328401 A1 Nov. 16, 2017

Related U.S. Application Data

(60) Provisional application No. 62/335,584, filed on May 12, 2016.

(51) Int. Cl.
*F16C 19/54* (2006.01)
*F16C 9/00* (2006.01)
*B62M 3/00* (2006.01)

(52) U.S. Cl.
CPC .............. *F16C 9/00* (2013.01); *B62M 3/003* (2013.01); *F16C 2326/20* (2013.01)

(58) Field of Classification Search
CPC ........ F16C 19/54; F16C 25/06; F16C 27/066; F16C 35/077; F16C 2326/28; B62K 19/34; B62M 3/003
See application file for complete search history.

(56) References Cited

U.S. PATENT DOCUMENTS

| 605,870 | A | 6/1898 | Gubelmann |
| 622,868 | A | 4/1899 | Simpson |
| 951,137 | A | 3/1910 | Lowrance |
| 3,578,829 | A * | 5/1971 | Hata ..................... B62M 3/003 384/458 |
| 4,406,504 | A | 9/1983 | Coenen et al. |
| 4,651,590 | A | 3/1987 | Thun |
| 7,152,501 | B2 | 12/2006 | Yamanaka et al. |
| 9,004,771 | B2 | 4/2015 | Earle et al. |
| 9,228,613 | B2 * | 1/2016 | Shiraishi ............... B62K 19/34 |

(Continued)

FOREIGN PATENT DOCUMENTS

DE 3531030 A1 3/1987

OTHER PUBLICATIONS

Jun. 1, 2010, International Search Report of the International Searching Authority from The U.S. Receiving Office, in PCT/US2010/025782, which is an international application of applicant, Praxis Works, LLC, 2 pages.

(Continued)

*Primary Examiner* — Phillip A Johnson
(74) *Attorney, Agent, or Firm* — Kolisch Hartwell, P.C.

(57) ABSTRACT

A bottom bracket for a bicycle may include a left bearing cup and a right bearing cup, the two bearing cups configured to be threaded together within a bottom bracket shell. Threading the bearing cups together may result in an axial force being applied to a resilient ring disposed on one of the bearing cups. This axial force may cause an outer diameter of the resilient ring to expand against an inner surface of the bottom bracket shell, thereby effectively locking the bottom bracket into the shell.

20 Claims, 13 Drawing Sheets

(56) References Cited

U.S. PATENT DOCUMENTS

2004/0045400 A1    3/2004   Alley
2007/0269155 A1   11/2007   Mori et al.
2009/0045600 A1    2/2009   Garnier

OTHER PUBLICATIONS

Jun. 1, 2010, Written Opinion of the International Searching Authority from The U.S. Receiving Office, in PCT/US2010/025782, which is an international application of applicant, Praxis Works, LLC, 5 pages.

Oct. 23, 2012, Office action from the U.S. Patent and Trademark Office, in U.S. Appl. No. 12/715,152, which is another application of applicant, Praxis Works LLC, 15 pages.

* cited by examiner

BOTTOM BRACKET HAVING AN EXPANDABLE RESILIENT RING

CROSS-REFERENCES

This application claims the benefit under 35 U.S.C. § 119(e) of the priority of U.S. Provisional Patent Application Ser. No. 62/335,584, filed May 12, 2016, the entirety of which is hereby incorporated by reference for all purposes.

The following related applications and materials are incorporated herein, in their entireties, for all purposes: U.S. Pat. No. 9,004,771.

FIELD

This disclosure relates to bottom brackets for bicycles. More specifically, the disclosed embodiments relate to systems and methods for aligning and securing a bottom bracket in a bottom bracket shell.

INTRODUCTION

The pedals of a bicycle are generally attached to crankarms on opposite sides of the bicycle frame. The crankarms are typically joined together by a spindle that passes through the frame, rigidly attaching the crankarms at positions that are oriented 180 degrees relative to each other. This allows the alternating pedaling motion familiar to all bicycle riders. Because of this arrangement, bicycles require a bearing assembly to allow for the rotation of the spindle and attached crankarms relative to the frame. This bearing assembly is commonly known as a bottom bracket, and the portion of the bicycle frame through which the assembly passes is commonly known as the bottom bracket shell of the frame.

Traditionally, bottom bracket shells have had standard inner diameters of approximately 34-35 millimeters (mm), with slight variations depending primarily on the geographic region in which the frame is manufactured. For example, the traditional English standard for the inside diameter of a bottom bracket shell is 33.6-33.9 mm, and the corresponding traditional Italian standard is 34.6-34.9 mm. Providing a standard bottom bracket inner diameter allows the manufacture of a variety of different bottom brackets that may be installed within a given bicycle frame.

Several forms of bottom brackets designed to fit within standard sized English and Italian bottom bracket shells have been commonly used in the bicycle industry. One of these is the traditional loose bearing bottom bracket, which includes a spindle incorporating outward facing bearing cones and a bearing cup on each side, at least one of which is adjustable. Loose bearings are installed between the bearing cones and bearing cups, the bearings are lubricated, and the cups are adjusted to allow rotation of the spindle without allowing spindle motion in any other direction. In a loose bearing bottom bracket, the cones, cups and bearings are typically all installed within the bottom bracket shell of the bicycle frame.

Another bottom bracket design that shares some common features with the loose bearing design is the cartridge style bottom bracket. A cartridge bottom bracket is generally a self-contained unit including an integrated spindle and bearings enclosed in bearing cups, all of which are preassembled and configured for easy installation and removal from the bottom bracket shell of the bicycle frame. Integrated seals also may be provided to prevent moisture, dirt and other contaminants from reaching the bearings, and when the cartridge unit wears out, it may simply be removed and replaced. As in the case of a loose bearing bottom bracket, the bearings and bearing cups of a cartridge bottom bracket are typically disposed within the bottom bracket shell of the bicycle frame when the bottom bracket is installed.

Because of the relatively small diameters of traditional bottom bracket shells, designs such as the loose bearing and sealed cartridge design (i.e., designs that dispose the bearings inside the bottom bracket shell of the bicycle frame) can have either relatively large bearings and a relatively thin spindle, or relatively small bearings and a relatively thick spindle. A small diameter spindle is generally undesirable because it is not as stiff or strong as a larger spindle, thus increasing the amount of rider energy lost to flexure of the spindle. Furthermore, to compensate for having a small diameter, loose bearing and cartridge style bottom bracket spindles are typically constructed from a relatively dense material such as steel or a steel alloy, which increases the weight of the bicycle. On the other hand, if a larger diameter spindle is used with these designs, then relatively small bearings must be used, resulting in a significant decrease in durability.

Accordingly, another type of bottom bracket that has found popularity within the bicycle industry in recent years is the "external bearing" bottom bracket, which also may be referred to as the outboard bearing bottom bracket. In an external or outboard bearing bottom bracket, bearing cups are typically installed into the bicycle frame on either side of the bottom bracket shell, and are configured to house relatively larger bearings outside the shell. Because the bearings are held outside the shell, the bearing housings impose less of a restriction on the inner diameter of the shell, and this allows a relatively large diameter spindle to pass through the shell.

The larger diameter spindle of an external bearing bottom bracket can be made stiffer and stronger than spindles used in internal bearing bottom brackets, and also can be made lighter through an appropriate choice of materials, and/or by making the spindle hollow. However, because external bearing systems typically rely on the precise alignment of threaded bearing cups separately installed in opposite sides of the bottom bracket shell of the bicycle frame, these systems may suffer from the problems of improper bearing alignment and resulting fast bearing wear.

Yet another type of bottom bracket that attempts to improve on previous designs is the oversize direct fit design, an example of which is the BB30 standard introduced by the Cannondale Bicycle Corporation in the year 2000. In systems of this type, bearings are press fit directly into an oversized (i.e., larger in diameter than the traditional English and Italian designs) bottom bracket shell of the bicycle frame. The bearings are typically disposed within the shell at positions determined by a snap-ring or some other similar retaining device within each side of the shell. Due to an increased bottom bracket shell diameter, these systems allow for the use of larger bearings and a larger diameter spindle than traditional systems, despite the fact that both bearings and spindle are typically disposed within the shell. However, parallel and concentric alignment of the bearings on either side of the shell may be difficult to achieve in direct fit designs, because the alignment of the bearing axes relies on the precise machining of the bottom bracket shell.

Similarly, in existing oversize direct fit bottom bracket designs it may be difficult to precisely control the lateral spacing between the bearings, which is typically determined by the lateral positions of snap-rings or similar components disposed within each side of the bottom bracket shell. Correct lateral spacing is generally correlated to bottom bracket life, because even a slight increase over the correct spacing can allow the crankarms and spindle to shift from side to side during pedaling, a phenomenon also known as "side-play." This results in periodic thrust loading on the bearings and can lead to premature bearing wear. Some direct fit systems side-load the bearings during assembly in an attempt to remove side-play, but this can further accelerate bearing wear due to increased overall bearing friction.

For all of the above reasons, it is desirable to develop an oversize bottom bracket that allows for the use of relatively large diameter bearings and a relatively large diameter spindle, but which reduces the potential for a lack of concentricity and proper spacing between opposing bearings, and which can be securely installed, easily manufactured, and can account for variable bottom bracket shell tolerances.

SUMMARY

The improved bottom brackets described herein address the above issues by providing a resilient, radially-expandable annular portion that automatically applies force to an inner wall of the bottom bracket shell as two opposing cup portions are assembled together within the shell.

The present disclosure provides systems, apparatuses, and methods relating to bottom brackets, e.g., for bicycles. In some embodiments, a bottom bracket for a bicycle may include: a left bearing cup including a left bearing housing at a left end and a first threaded portion at a right end; a right bearing cup including a right bearing housing at a right end and a second threaded portion at a left end, the second threaded portion engaged with the first threaded portion such that the left bearing housing is coaxially aligned with the right bearing housing; the left bearing cup and the right bearing cup collectively defining a bottom bracket having a body portion extending between the left bearing housing and the right bearing housing, the body portion having a maximum outer diameter; the left bearing cup including a first annular abutment and the right bearing cup including an opposite-facing second annular abutment; and a resilient ring substantially coaxial with the left and right bearing cups and disposed intermediate the first annular abutment and the second annular abutment; wherein the bottom bracket is transitionable between: a first configuration, in which the resilient ring has a first outer diameter and the first annular abutment is spaced from the second annular abutment by a first distance, and a second configuration, in which the first annular abutment is spaced from the second annular abutment by a second distance smaller than the first distance and an axial force is applied to the resilient ring such that at least a portion of the resilient ring is expanded radially outward to a second outer diameter greater than the maximum outer diameter of the body portion of the bottom bracket.

In some embodiments, a bicycle bottom bracket may include a bottom bracket shell having an inner wall; a first bearing cup including a first threaded portion; a second bearing cup including a second threaded portion mated with the first threaded portion to couple the first and second bearing cups in a generally coaxial alignment within the bottom bracket shell; a first member having a first surface coupled to and movable with the first bearing cup; a second member having a second surface coupled to and movable with the second bearing cup; and a resilient annulus disposed on an outer surface of the first bearing cup, between the first and second surfaces; wherein coupling the first and second bearing cups is configured to bring the first and second surfaces toward each other, compressing the resilient annulus and expanding at least a portion of the resilient annulus radially outward against the inner wall of the bottom bracket shell.

In some embodiments, a method of installing a bottom bracket in a bicycle frame may include mounting a left bearing cup in a left side portion of a bottom bracket shell of a bicycle frame by pressing the left bearing cup into the bottom bracket shell; mounting a right bearing cup in a right side portion of the bottom bracket shell, the right bearing cup having an annular sleeve and a resilient ring coaxially disposed thereon; and impinging on the resilient ring by urging the left bearing cup and right bearing cup closer together; wherein impinging on the resilient ring causes at least a portion of the resilient ring to expand against an inner surface of the bottom bracket shell.

Features, functions, and advantages may be achieved independently in various embodiments of the present disclosure, or may be combined in yet other embodiments, further details of which can be seen with reference to the following description and drawings.

DESCRIPTION

Figure 1:
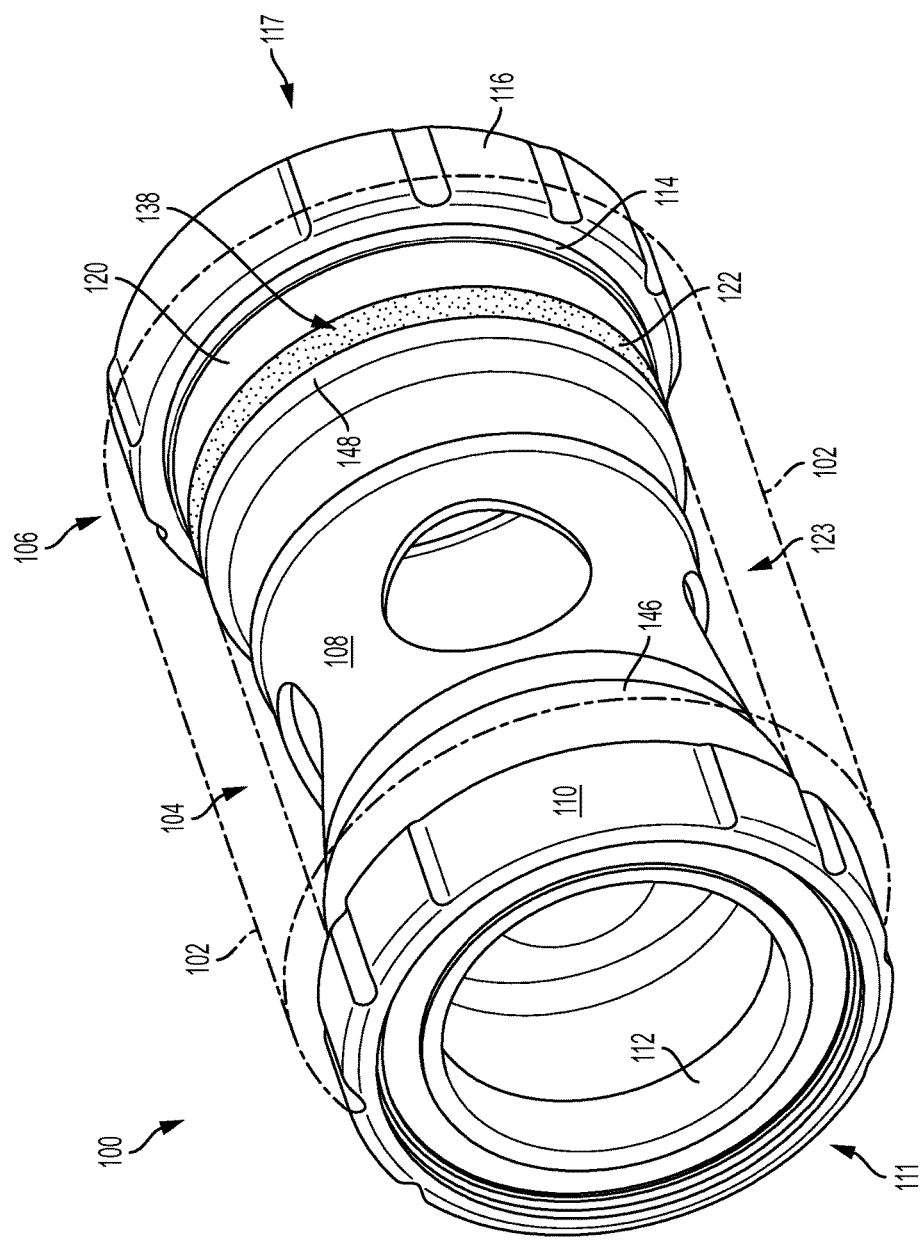
FIG. 1 is an oblique isometric view of an illustrative bottom bracket in accordance with aspects of the present disclosure, as viewed from a left end of the bottom bracket, including an illustrative bottom bracket shell (in phantom lines).

The present disclosure provides improved bicycle bottom bracket systems and related methods. Various aspects and examples of bottom brackets having expandable ring portions, as well as related methods, are described below and illustrated in the associated drawings. Unless otherwise specified, the presently described bottom brackets and/or their various components may, but are not required to, contain at least one of the structure, components, functionality, and/or variations described, illustrated, and/or incorporated herein. Furthermore, the process steps, structures, components, functionalities, and/or variations described, illustrated, and/or incorporated herein in connection with the present teachings may, but are not required to, be included in other similar systems or methods. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated or modified.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Coupled" means connected, either permanently or releasably, whether directly or indirectly through intervening components.

The terms "inboard," "outboard," "left," and "right" (and the like) are intended to be understood in the context of a host vehicle (e.g., a bicycle) on or in which systems described herein may be mounted or otherwise attached. For example, "outboard" may indicate a relative position that is laterally farther from the centerline of the host bicycle, or a direction that is away from the bicycle centerline. Conversely, "inboard" may indicate a direction toward the centerline, or a relative position that is closer to the centerline. Similarly, "left" means toward the left side of the bicycle (from the point of view of a rider), and "right" means toward the right side of the bicycle. In the absence of a host vehicle, the same directional terms may be used as if the vehicle were present. For example, even when viewed in isolation, a bottom bracket may have a "right" portion, based on the fact that the portion in question would be installed facing in the direction of the right side of a host bicycle.

The terms "axial" and "radial" (and the like) are intended to be understood in the context of the generally cylindrical bottom bracket, where axial means in a direction substantially parallel to the long axis of the bottom bracket or bottom bracket shell, and therefore substantially parallel to the long axis of a spindle coaxially inserted through the bottom bracket. Radial means substantially in a direction that transversely (e.g., orthogonally) intersects the long axis of the bottom bracket, e.g., outward or inward along a radius of the bottom bracket.

Overview

In general, bicycle bottom brackets according to the present teachings may include an expandable ring portion, e.g., a rubber O-ring, disposed between a left bearing cup and a right bearing cup, which themselves thread together. Assembly of such a bottom bracket compresses the ring portion in an axial direction, causing it to expand outward (i.e., radially), thereby pressing against an inner wall of the bottom bracket shell. The force exerted on the shell wall by the expanding ring portion fixes (or "locks") the bottom bracket in position within the shell (and thereby within the bicycle frame). When bearings work loose over time in the bottom bracket shell, creaking and damage can result. Bottom brackets according to the present teachings are configured to axially align the bearings while locking the bearing cups with respect to the shell using a resilient member that expands in place. By using an element that expands in place, the same element can both align and secure the bottom bracket with respect to the shell, while the left and right cups thread together to provide axial alignment of the bearings. Overall, bearing life is improved through the use of these mechanisms.

Examples, Components, and Alternatives

The following sections describe selected aspects of exemplary bottom brackets having expandable ring portions, as well as related systems and/or methods. The examples in these sections are intended for illustration and should not be interpreted as limiting the entire scope of the present disclosure. Each section may include one or more distinct examples, and/or contextual or related information, function, and/or structure.

A. First Illustrative Bottom Bracket

Figure 2:
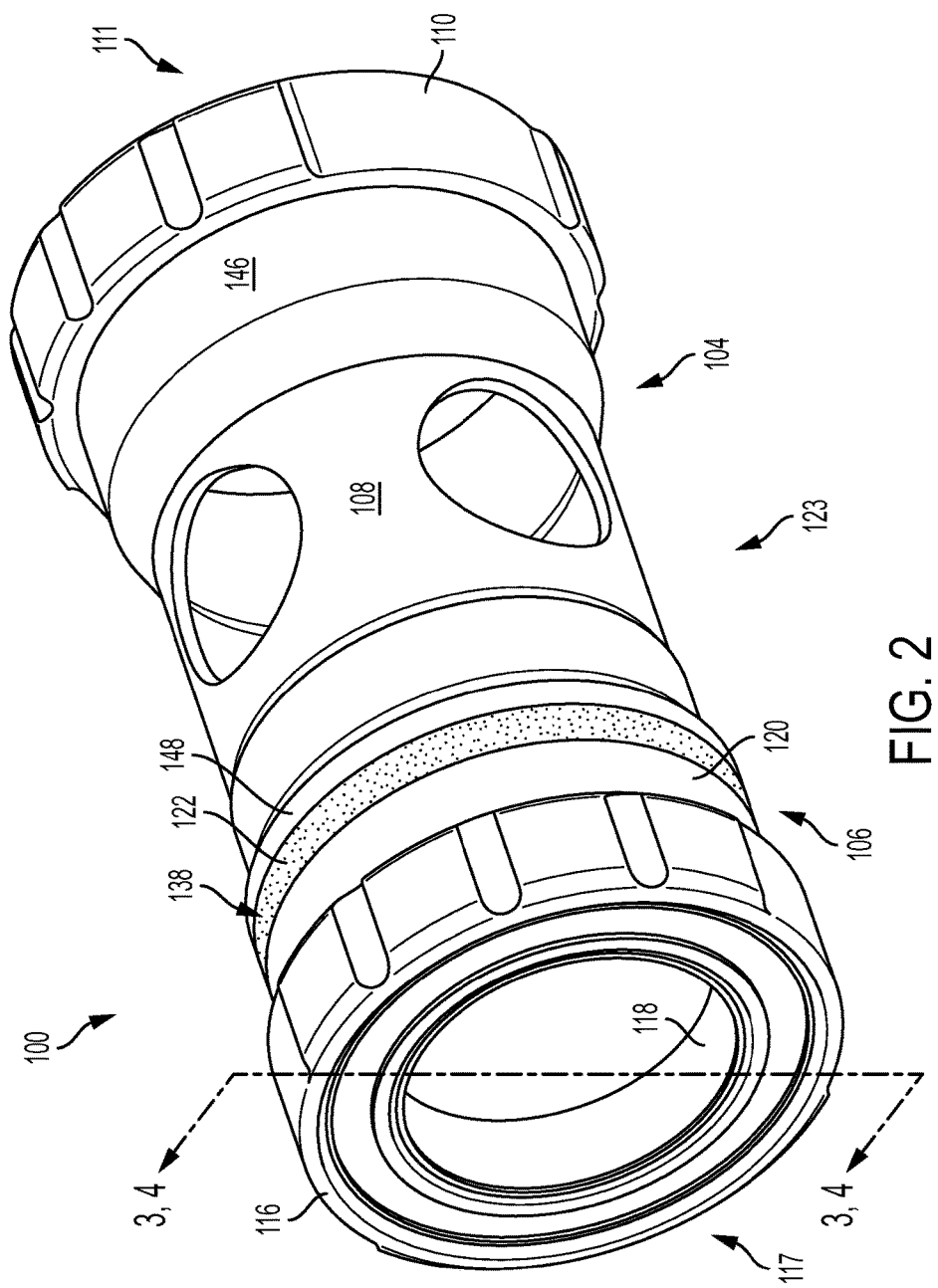
FIG. 2 is an oblique isometric view of the bottom bracket of FIG. 1, as viewed from a right end.
Figure 3:
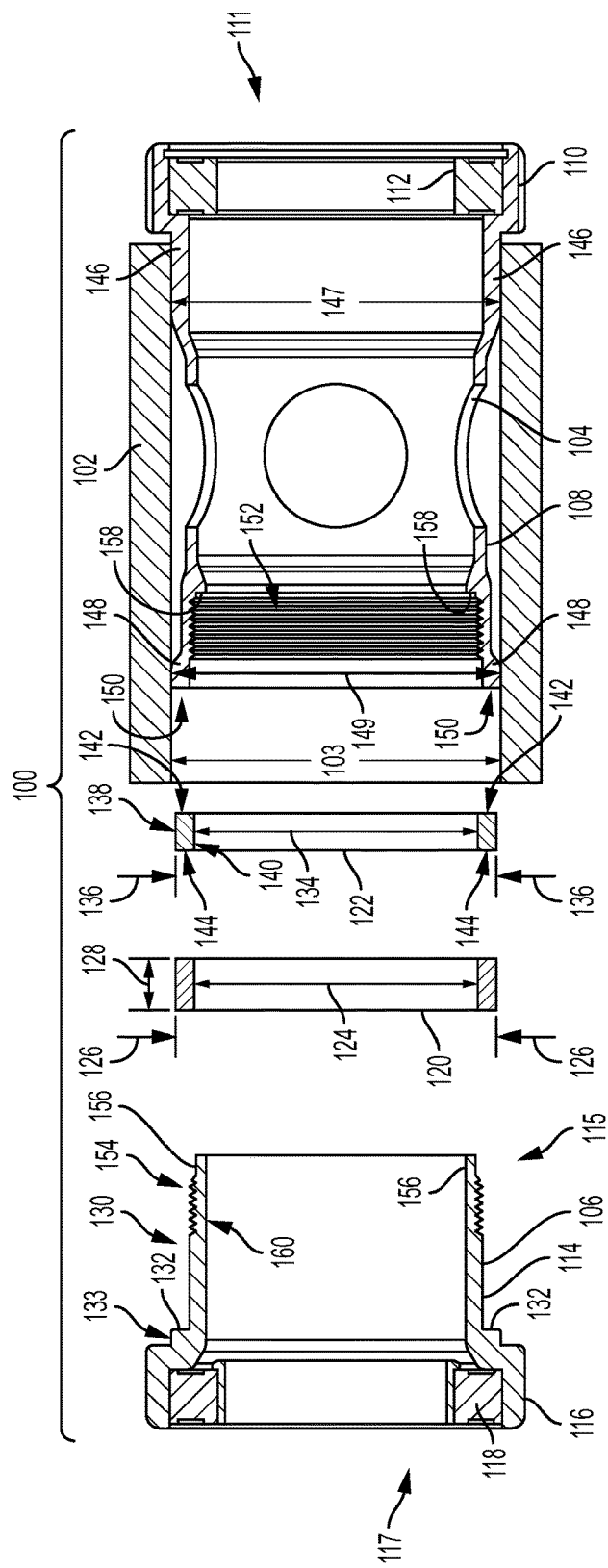
FIG. 3 is a side elevation, exploded view of the bottom bracket of FIG. 1, including the bottom bracket shell.

As shown in FIGS. 1-3, this section describes an illustrative bottom bracket (BB) 100 having an expandable ring portion. BB 100 is an example of the bottom bracket described generally above. BB 100 may be referred to as a bottom bracket system.

FIG. 1 is an oblique isometric view of BB 100 from a left end of the bottom bracket, and FIG. 2 is an oblique isometric view of BB 100 from a right end. FIG. 3 is a side elevation, exploded view of BB 100, including a bottom bracket shell 102.

BB 100 includes a left bearing cup 104 and a right bearing cup 106. For convenience, the non-drive side of the bottom bracket may be referred to as the left, left hand, or LH side and the drive side of the bottom bracket may be referred to as the right, right hand, or RH side, as these reflect the standard arrangement for a typical bicycle. Accordingly, the respective terms may be used interchangeably. However, a system having the sides reversed, i.e., with the drive side on the left, is also contemplated and would be completely within the teachings of the present disclosure.

Bottom bracket 100 may be installed or mounted in bottom bracket shell 102. The bottom bracket shell may be an integrated bottom bracket shell portion of a bicycle frame (see FIG. 9), or it may be a separate shell which is configured to fit securely within the bottom bracket shell of the bicycle frame, for example by slip fitting, press fitting or the like. In the case of a separate shell, the shell may also be referred to as a shim. For simplicity, shell 102 will be described from this point forward as being an integrated portion of a bicycle frame. However, the other described components of the bottom bracket can also function with an appropriate choice of a separate shell that fits within a bicycle frame. Shell 102 has an inner diameter (ID) 103.

Left bearing cup 104 includes a left mounting portion 108 at a right end 109 configured to be installed within a left side portion of shell 102, and a left bearing housing 110 at a left end 111 configured to enclose a left bearing 112. Right bearing cup 106 includes a right mounting portion 114 at a left end 115 configured to be mounted within a right side portion of shell 102, and a right bearing housing 116 at a right end 117 configured to enclose a right bearing 118.

Left bearing housing 110 and right bearing housing 116 may be configured to be disposed outside shell 102 when the bottom bracket is assembled. Accordingly, bearings 112 and 118 will also be disposed outside shell 102, and BB 100 may be described as an external or outboard bottom bracket system. The present teachings also contemplate that bearings and bearing housings may be disposed within the bottom bracket shell.

BB 100 further includes an axially non-compressible compression sleeve 120 and an elastically- or resiliently-compressible, expanding ring portion 122. Expanding ring portion 122 may be referred to interchangeably as a resilient ring, a resilient annulus, and/or a resilient annular portion. Compression sleeve 120 includes an annular ring or sleeve comprising an axially rigid structure. Compression sleeve 120 may include any suitable structure and/or material configured to function as a structural spacer for transmitting axial force from, in this embodiment, the RH bearing cup to expanding ring portion 122. In some examples, compression sleeve 120 comprises a composite material, or a plastic (e.g., acrylonitrile butadiene styrene (ABS)). In some examples, compression sleeve 120 comprises a metal, such as aluminum or steel, or any suitable alloy.

During assembly or disassembly, LH bearing cup 104 and RH bearing cup 106 may be threaded together to collectively form a body portion 123 extending between the bearing housings, as described further below. Accordingly, the two cups may be configured to rotate relative to each other, at least in certain circumstances. In some examples, the design and/or material of sleeve 120 facilitates this rotation of RH bearing cup 106 relative to sleeve 120, such that rotation of RH bearing cup 106 does not disturb and/or damage the possibly more fragile ring portion 122. For example, using a plastic sleeve 120 that is a separate component relative to the two bearing cups may facilitate reduced-friction rotation of RH bearing cup 106 against a right edge of the plastic sleeve, while the sleeve remains stationary with respect to expandable ring portion 122. Nevertheless, in some examples, compression sleeve 120 is instead connected to or unitary with right bearing cup 106 rather than being a separate component of BB 100.

In the examples shown in FIGS. 1-3, compression sleeve 120 has an inner diameter (ID) 124 and an outer diameter (OD) 126, and an axial width 128. ID 124 and OD 126 of sleeve 120 are sized such that the sleeve is disposed in a sliding fit over right side mounting portion 114 and within shell 102. OD 126 may be substantially similar to (e.g., may conform to) inner diameter 103 of the shell. More specifically, compression sleeve 120 may slidingly fit over an unthreaded cylindrical portion 130 of right side mounting portion 114 and abut a stepped abutment 132 adjacent to right side bearing housing 116. Abutment 132 may include a circumferential or annular abutment. The side edge of compression sleeve 120 may be in full 360-degree contact with the abutment. In some examples, an outer diameter 133 of abutment 132 may conform to ID 103 of shell 102.

Expanding ring portion 122 has an inner diameter (ID) 134 and an outer diameter (OD) 136. Expanding ring portion 122 may comprise any suitable resilient structure configured to respond to a compressive force by exerting an expansive force. The two forces may be along different vectors, depending, for example, on constraints placed upon the ring portion. In other words, the expanding ring portion may comprise elastic material that (within limits) absorbs energy when it is forcibly deformed, and releases the absorbed energy when the force is removed. In some circumstances, an absorbed loading force may be released along an unconstrained vector, such that compression in one direction results in expansion in another direction. In some examples, this mechanism is utilized by BB 100 to exert force on shell 102 by compressing ring portion 122, e.g., while selectively constraining aspects of the ring portion. (See detailed description below).

Ring portion 122 may have any suitable cross-sectional shape (e.g., round, elliptical, square, rectangular, trapezoidal, or the like, including non-symmetrical shapes). In the examples described with respect to FIGS. 1-3, ring portion 122 has a rectangular cross section, such that ring portion 122 has an outer surface 138, an inner surface 140 opposite surface 138, and opposing side surfaces 142 and 144 (also referred to as edges). Ring portion 122 may be referred to as an O-ring. In some examples, ring portion 122 may comprise a rubber O-ring.

As best depicted in FIG. 3, left mounting portion 108 is generally cylindrical, and may include a first cylindrical portion 146 adjacent LH bearing housing 110. First cylindrical portion 146 has an outer diameter (OD) 147 conforming to ID 103 of shell 102. A second cylindrical portion 148 is disposed at an opposite end (i.e., right end 117) of left mounting portion 108, and also has an OD 149 conforming to ID 103 of shell 102. OD 147 and OD 149 may be identical. In this example, cylindrical portion 148 is configured such that it presents an end face 150 to ring portion 122. One or more substantially cylindrical portions of left mounting portion 108 may be disposed between portions 146 and 148. In the examples described here, these intermediate portions may have smaller ODs than portions 146 and 148.

Left mounting portion 108 may include a threaded inner surface 152 disposed proximate cylindrical portion 148. This threaded surface may be configured to interface with a corresponding threaded outer surface 154 on RH bearing cup 106 to axially align and securely couple the left and right bearing cups to each other. An unthreaded lip 156 may extend, at a distal end (i.e., left end 111) of RH mounting portion 114, from threaded surface 154. A corresponding interior abutment 158 (also referred to as a ridge, protrusion, mechanical stop, and/or contact surface) may be disposed around an inner surface of LH mounting portion 108, such that threading together of the RH bearing cup and the LH bearing cup is eventually arrested in response to lip 156 contacting abutment 158.

An unthreaded inner surface 160 may be disposed proximal a distal end (i.e., right end 117) of LH mounting portion 108. Unthreaded inner surface 160 may correspond to cylindrical portion 148. Inner surface 160 may be sized and configured to mate in a friction fit with unthreaded cylinder portion 130 of RH mounting portion 114. This mating may be configured to ensure and/or mechanically enforce coaxial alignment between LH bearing cup 104 and RH bearing cup 106 when assembled together.

Figure 4:
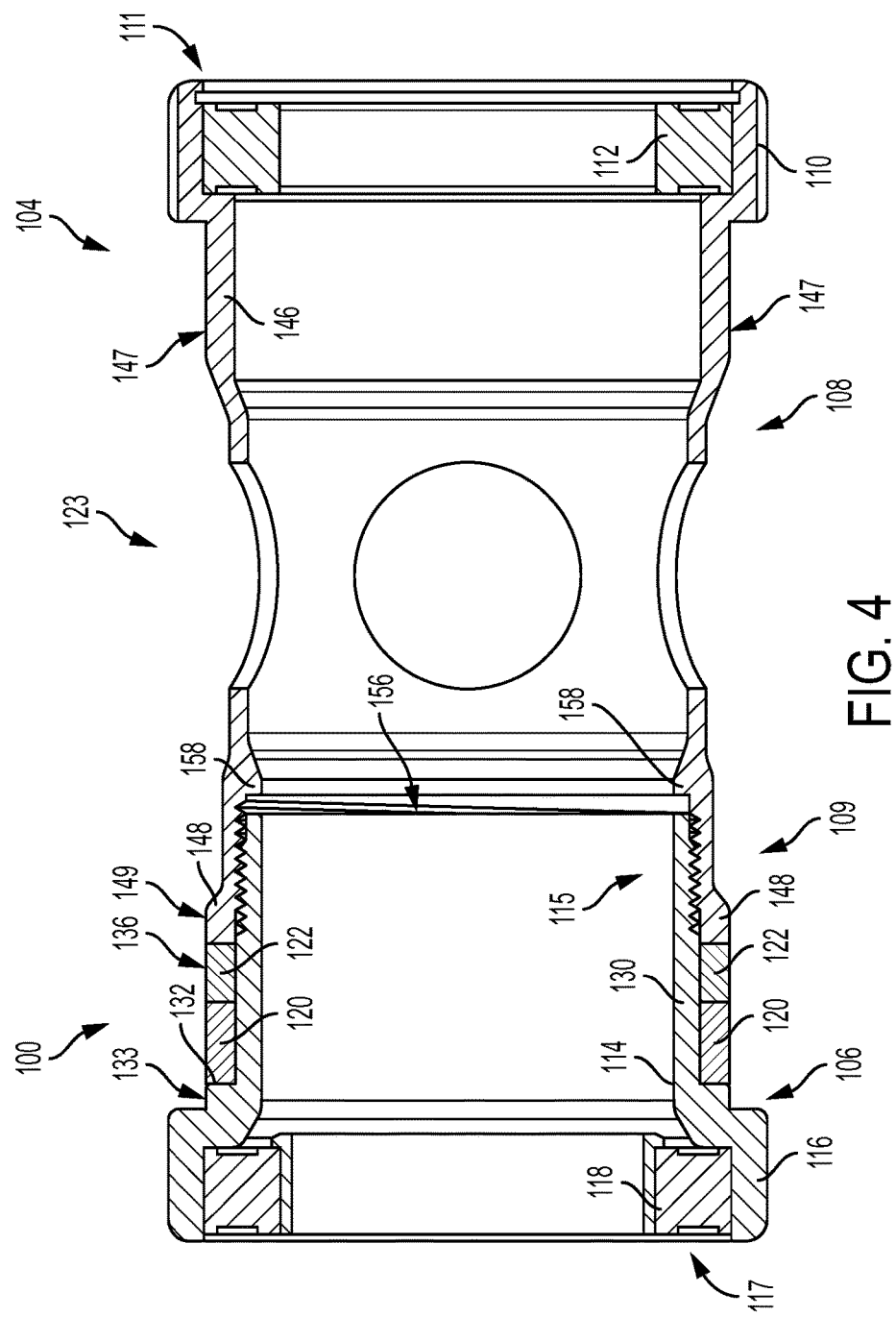
FIG. 4 is a sectional side view of the bottom bracket of FIG. 1, wherein the resilient ring portion is unexpanded.
Figure 5:
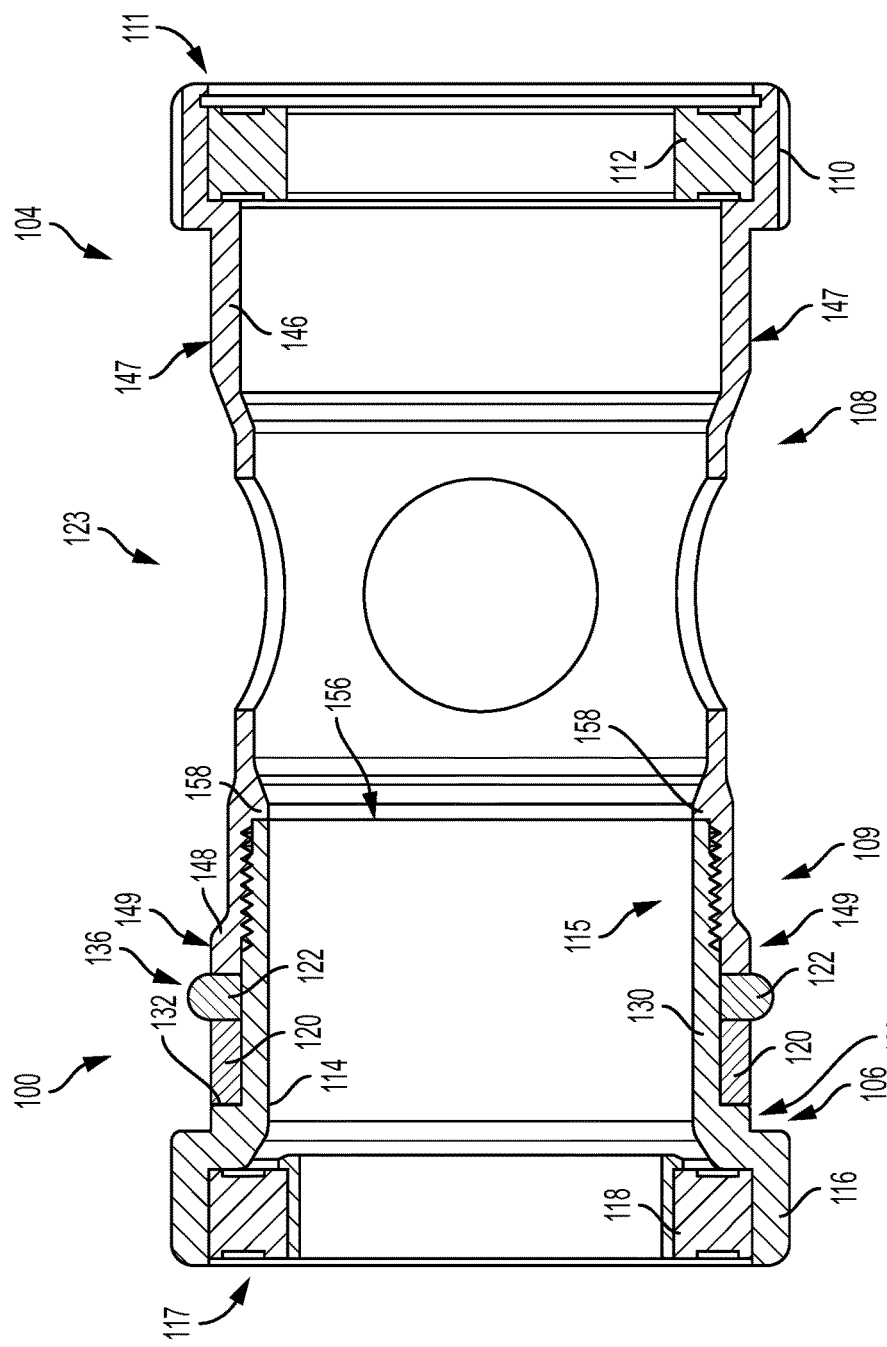
FIG. 5 is a sectional side view of the bottom bracket of FIG. 1, in a second configuration with the resilient ring expanded.

Turning to FIGS. 4-8, the mechanism by which BB 100 is secured within shell 102 will now be described in greater detail. FIGS. 4 and 5 are sectional side views of BB 100. FIG. 4 shows the assembled BB 100 having a first degree of threaded engagement between the bearing cups (i.e., incomplete engagement), and FIG. 5 shows the assembled BB 100 having a second degree of threaded engagement (i.e., complete engagement).

The sectional views of FIGS. 4 and 5 show BB 100 having an uncompressed (FIG. 4) and compressed (FIG. 5) ring portion 122. In these views, shell 102 is absent. Accordingly, compression of ring portion 122 causes a bulging or outward radial expansion of the ring portion. This outward expansion causes the OD of ring portion 122 to be greater than the largest or maximum OD of body portion 123. In other words, the outer diameters of left mounting portion 108, right mounting portion 114, and compression sleeve 120 are generally no greater than a certain maximum OD, to allow BB 100 to be inserted into and removed from shell 102. OD 136 of ring portion 122 is generally in compliance with that maximum OD when undisturbed. However, impinging on ring portion 122 (e.g., by compressing or wedging against it) causes OD 136 to exceed the maximum OD of body portion 123, as depicted in FIGS. 5, 7, and 8.

Outward expansion of ring portion 122 is caused by coupling LH bearing cup 104 to RH bearing cup 106 using threads 152 and 154. As shown in FIG. 5, threading together of the cups may proceed to a point where compression sleeve 120 is butted up against abutment 132 on one side and against ring portion 122 on the other. Ring portion 122 is held against end face 150 of LH mounting portion 108. In this example, abutment 132 may be described as a first annular abutment, and end face 150 may be described as a second annular abutment, wherein ring portion 122 is disposed intermediate the first and second annular abutments.

Further rotation of one or both cups draws the cups closer to each other, and causes axially compressive force to be applied to side surface 142 of ring portion 122. Ring portion 122 is further constrained on side surface 144 by end face 150 of LH mounting portion 108, and on inner surface 140 by cylindrical portion 130 of RH mounting portion 114. Accordingly, as shown in FIG. 6, the ring portion responds by expanding resiliently in an unconstrained direction (i.e., radially outward).

Figure 6:
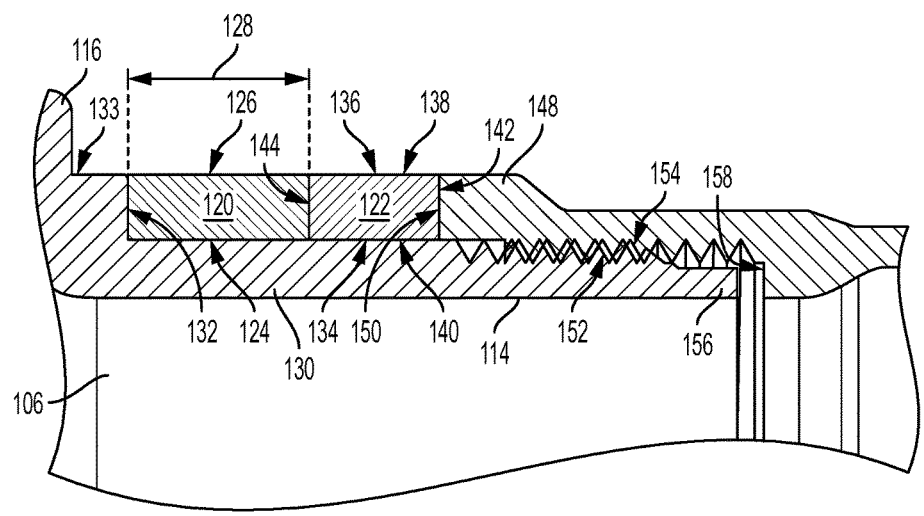
FIG. 6 depicts a partial, magnified view of a region surrounding the resilient ring of FIG. 4.
Figure 7:
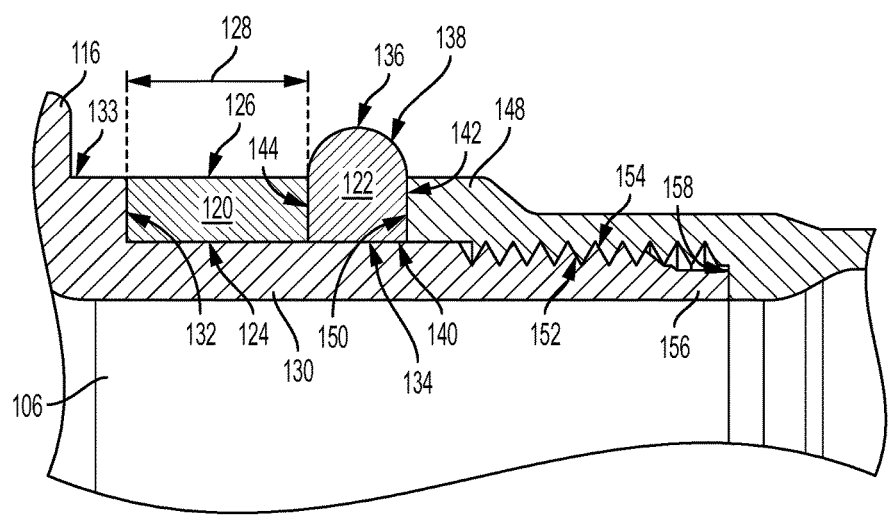
FIG. 7 depicts a partial, magnified view of the region surrounding the resilient ring of FIG. 5.
Figure 8:
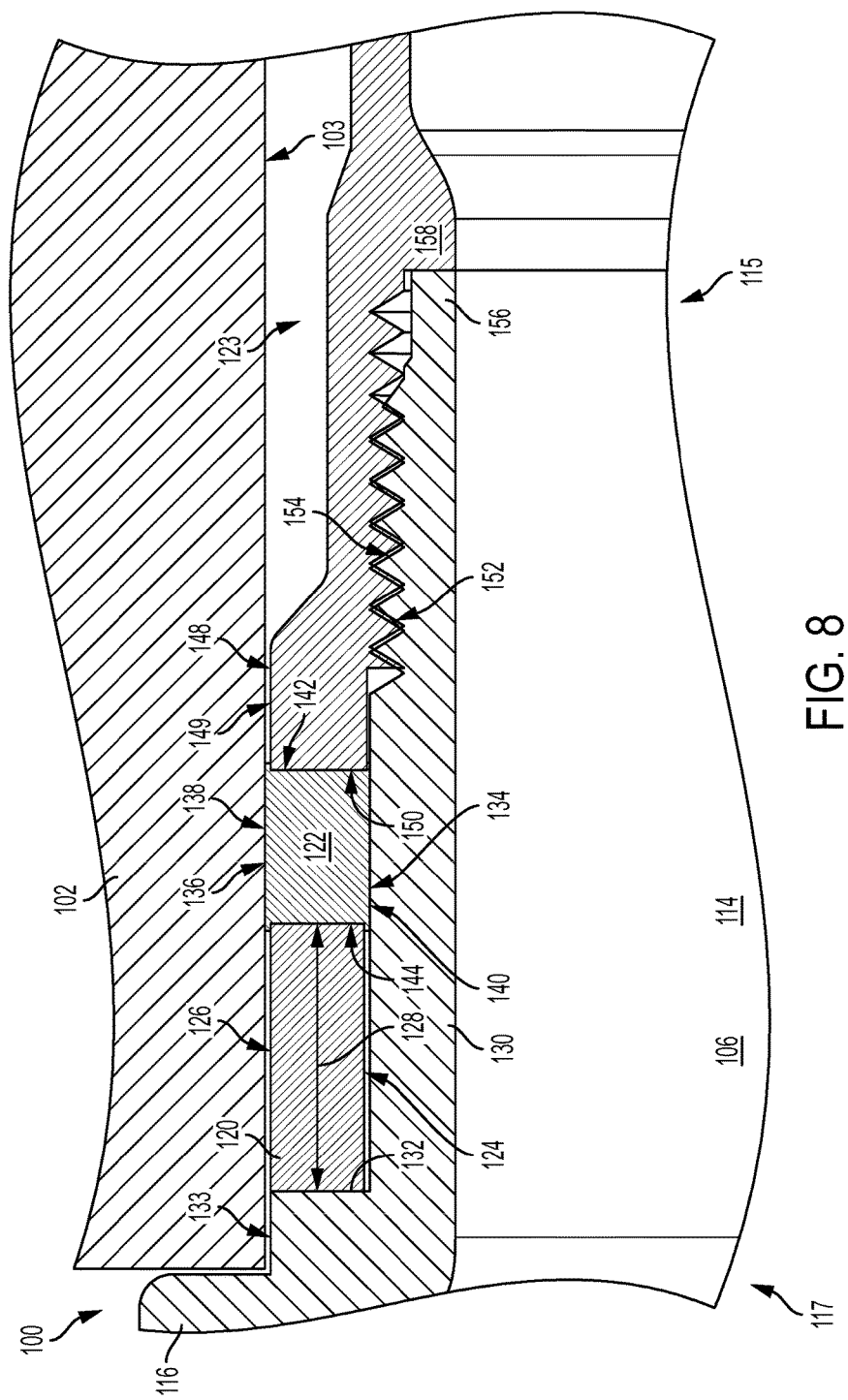
FIG. 8 illustrates another partial, magnified view of the region surrounding the resilient ring of the illustrative bottom bracket, with the resilient ring constrained by and expanding against the bottom bracket shell.

FIGS. 6 and 7 depict the same contact with and subsequent expansion of the ring portion (in partial, magnified view). As best seen in FIGS. 6 and 7, the slip fit or friction fit between unthreaded cylinder portion 130 and unthreaded inner surface 160 may be configured, e.g., by tight manufacturing tolerances, to align or maintain coaxial alignment between the LH and RH bearing cups. This alignment may be further maintained by mating of the threads of threaded surfaces 152 and 154. Also best seen in FIGS. 6 and 7, compression of the ring portion may be limited by lip 156 abutting against internal abutment 158. In some examples, the abutment of lip 156 against internal abutment 158 may be selected to occur at a desired axial width of BB 100, e.g., corresponding to a width of shell 102.

In some examples, compression of ring 122 may be adjusted or selected by controlling or selecting the magnitude of width 128 of the compression sleeve. For example, increasing the width of the compression sleeve may result in greater compression of the O-ring. In some examples, multiple compression sleeves having the same or different widths 128 may be provided. A selected one or more such sleeves may be installed, depending on the desired compression, dimensions of the shell, etc.

Although FIGS. 4-7 show how the O-ring may expand if radially unconstrained, one function of the expanding ring portion is to contact and apply force to the inner surface of shell 102. Accordingly, ring portion 122 may be constrained from expanding in a radially outward direction by the proximity of shell 102. In some examples, a benefit of using this expanding ring mechanism is that it provides a relatively high tolerance for varying discrepancies between the outer diameter of the bottom bracket body and the inner diameter of the shell.

FIG. 8 illustrates how ring portion 122 contacts and is constrained by shell 102 as the ring portion expands. FIG. 8 parallels the expanded state shown in FIGS. 5 and 7. As shown in FIG. 8, ring portion 122 will only bulge or expand outward to the extent allowed by shell 102. In some examples, e.g., where the OD of body portion 123 very tightly conforms to ID 103, the physical outward increase in OD 136 may be quite small. However, by contacting and pressing against the inner wall of shell 102, ring portion 122 exerts a force on shell 102, thereby coupling BB 100 to shell 102 and locking the bottom bracket in position. Further contributing to this locked-in state is the application of radial force to the outer surface of the body of the bottom bracket underlying ring portion 122. In this example, the resilient ring portion applies a force in both radial directions (i.e., inwardly and outwardly) to ensure the bottom bracket does not move relative to the shell.

Releasing the force placed on ring portion 122 by compression sleeve 120, such as by separating cups 104 and 106, causes ring portion 122 to elastically return to its original shape and to cease applying force to shell 102. Accordingly, separation of the LH and RH bearing cups from each other, e.g., by rotating one of the cups to loosen the threaded portions, will uncouple BB 100 from shell 102.

Figure 9:
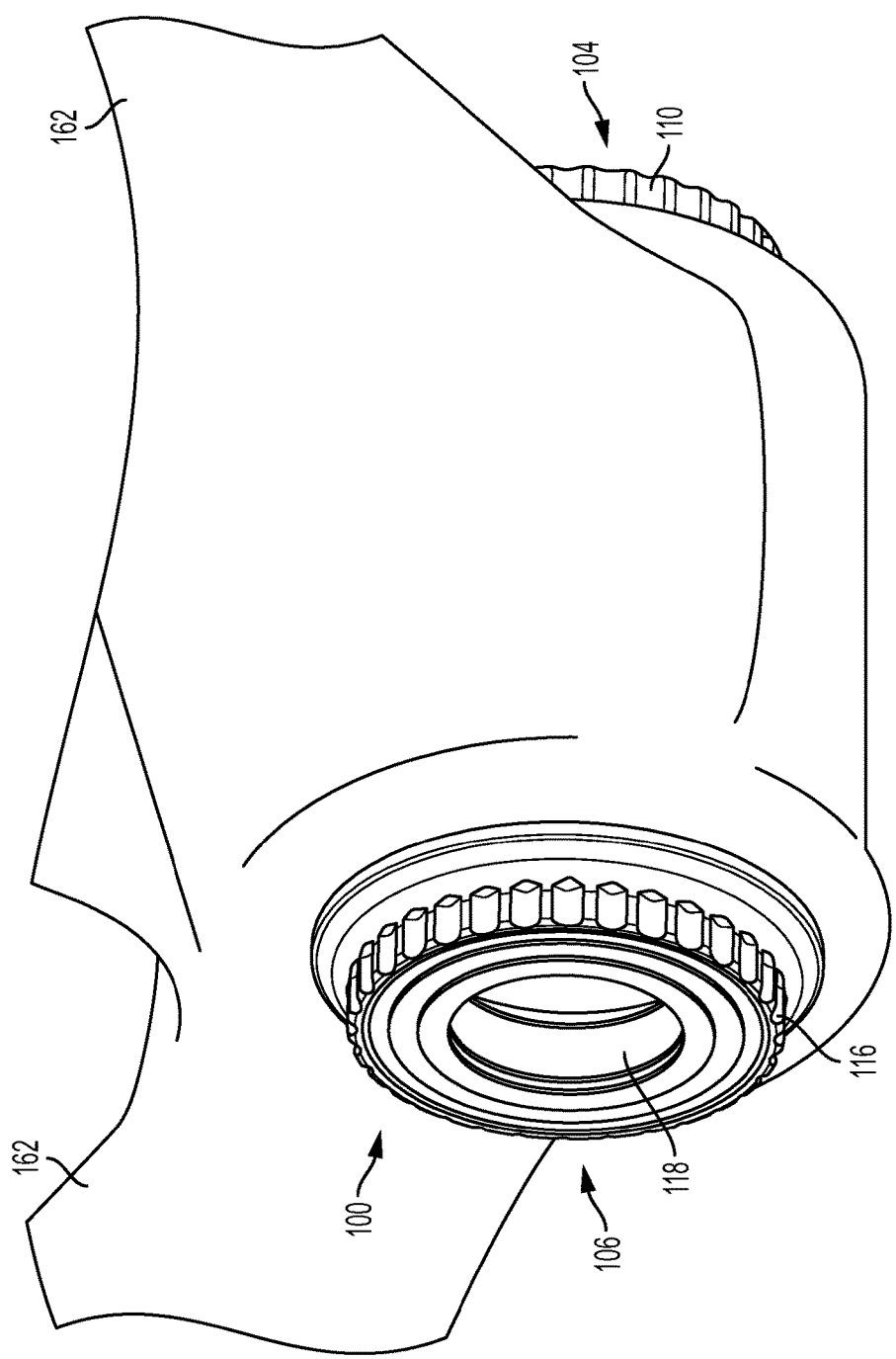
FIG. 9 is an isometric, partial view of a bicycle frame having an illustrative bottom bracket installed therein, according to the present teachings.

FIG. 9 is an isometric, partial view of a bicycle frame 162 having an example of BB 100 installed therein. In this example, shell 102 is an integral part of frame 162.

B. Second Illustrative Bottom Bracket

Figure 10:
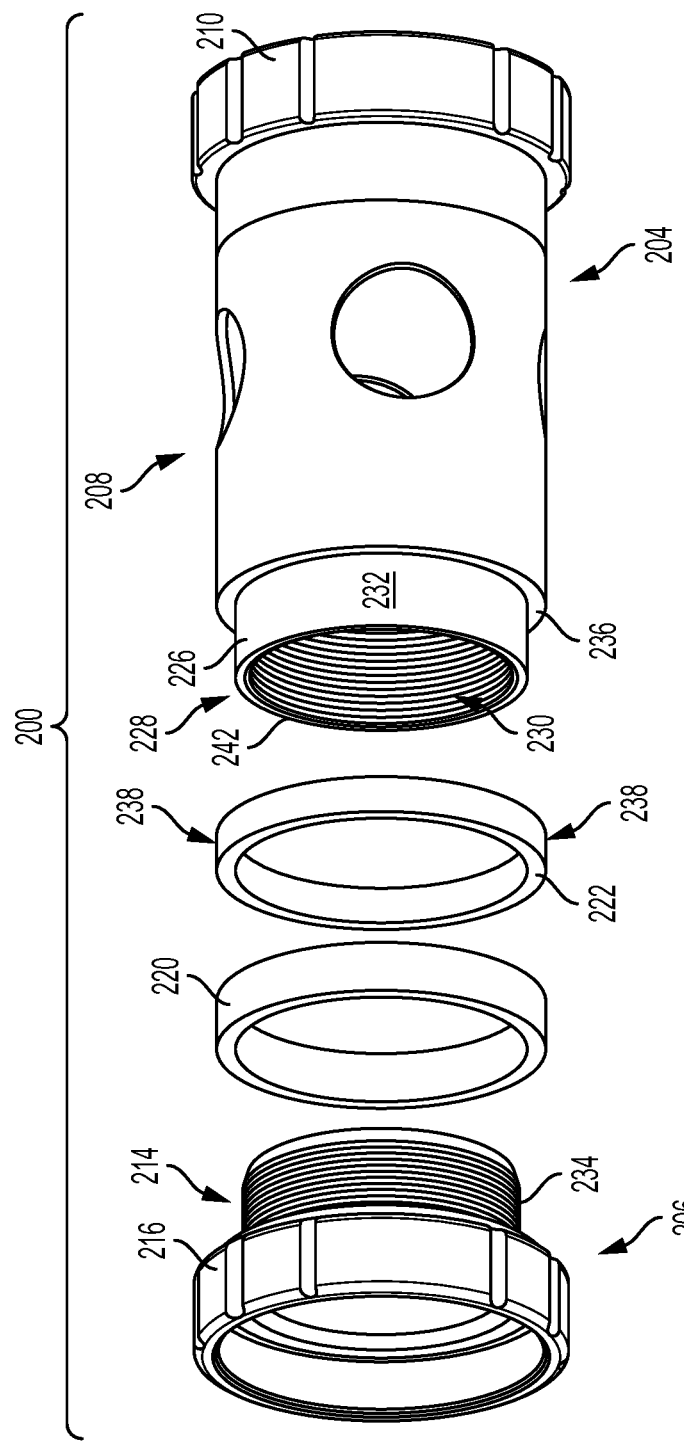
FIG. 10 is an exploded view of another illustrative bottom bracket in accordance with aspects of the present disclosure.
Figure 11:
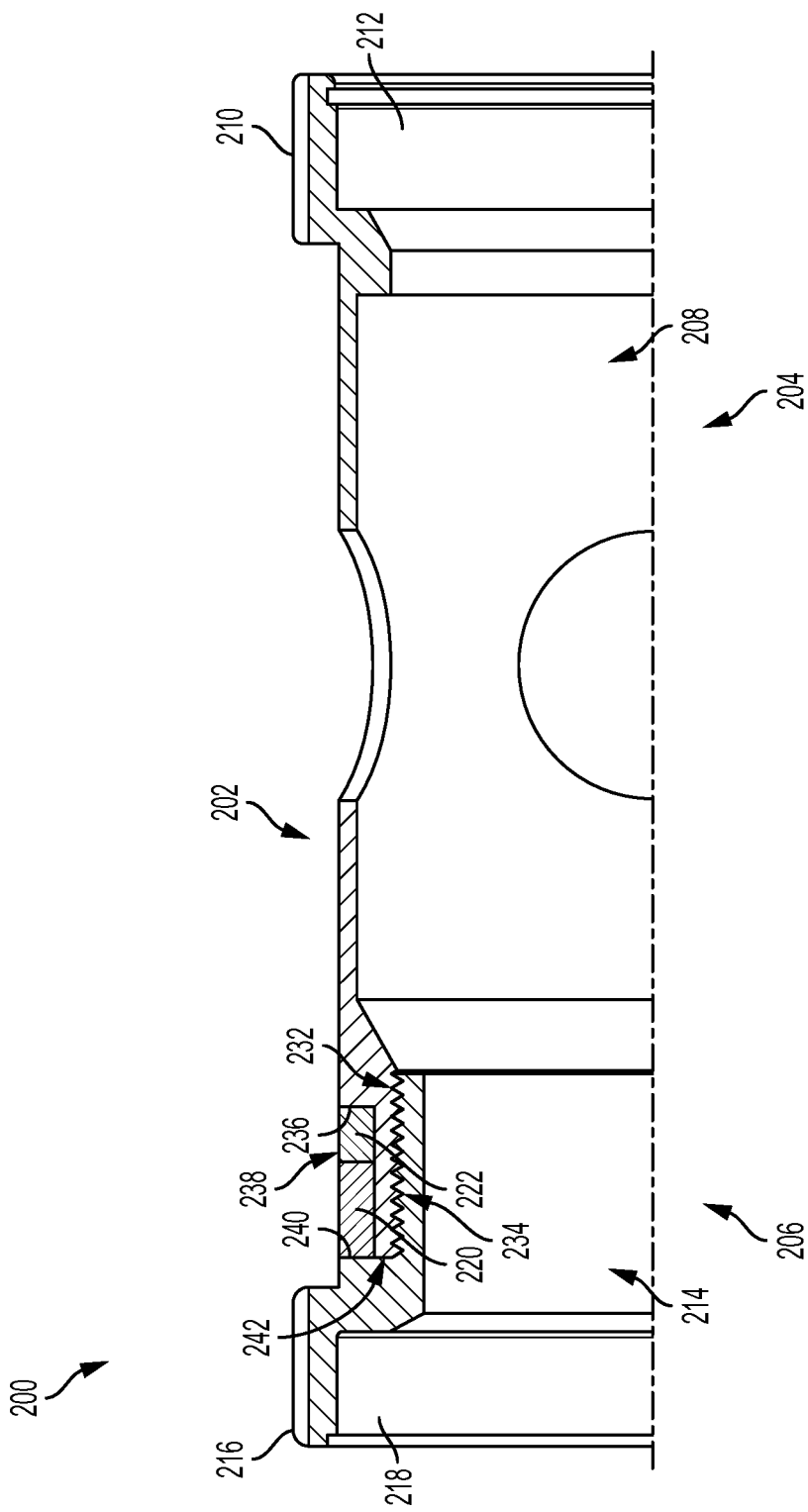
FIG. 11 is a partial, sectional elevation view of the bottom bracket of FIG. 10, as assembled.

As shown in FIGS. 10-11, this section describes another illustrative bottom bracket (BB) 200 having an expandable ring portion. BB 200 is an example of the bottom bracket described generally above, and is substantially similar to bottom bracket 100. BB 200 may be referred to as a bottom bracket system.

BB 200 is functionally similar to BB 100, and includes many substantially similar elements. FIG. 10 is an exploded view of BB 200. FIG. 11 is a partial, sectional elevation view of BB 200, as assembled. Some features of BB 200 are only shown in one of the figures.

As shown in FIGS. 10 and 11, BB 200 includes a LH cup 204 and a RH cup 206. As described with respect to BB 100, LH cup 204 includes a LH mounting portion 208 and a LH bearing housing 210 for housing a LH bearing 212. Similarly, RH cup 206 includes a RH mounting portion 214 and a RH bearing housing 216 for housing a RH bearing 218. A compression sleeve 220 and a resilient O-ring 222 are also provided, substantially as described above with respect to BB 100. When threaded together, LH mounting portion 208 and RH mounting portion 214 collectively form a body portion 202 of BB 200 between the bearing housings.

BB 200 includes a cylindrical portion 226 at a distal end 228 of LH mounting portion 208 having an internal threaded surface 230 and an exterior unthreaded surface 232. Unlike BB 100, compression sleeve 220 and O-ring 222 are disposed on unthreaded surface 232 of the LH cup, and an exterior threaded portion 234 of RH cup 206 mates with threaded surface 230. Compression of O-ring 222 is caused by threading the two cups together, causing an axial force to be applied to O-ring 222 as it is impinged upon by compression sleeve 220 and a first annular abutment 236 of LH cup 204. This compresses O-ring 222 and causes an OD 238 of the O-ring to expand radially outward, such that OD 238 becomes greater than the OD of body portion 202, or at least to attempt such an expansion (as limited by an adjacent bottom bracket shell).

In this example, compression sleeve 220 is disposed between O-ring 222 and a second annular abutment 240 on RH cup 206. Threaded engagement of the cups may be arrested by a distal lip 242 of LH cup 204 abutting against abutment 240, as shown in the drawings. In BB 200, coaxial alignment of the cups is maintained by the threaded portions when assembled together.

B. Third Illustrative Bottom Bracket

Figure 12:
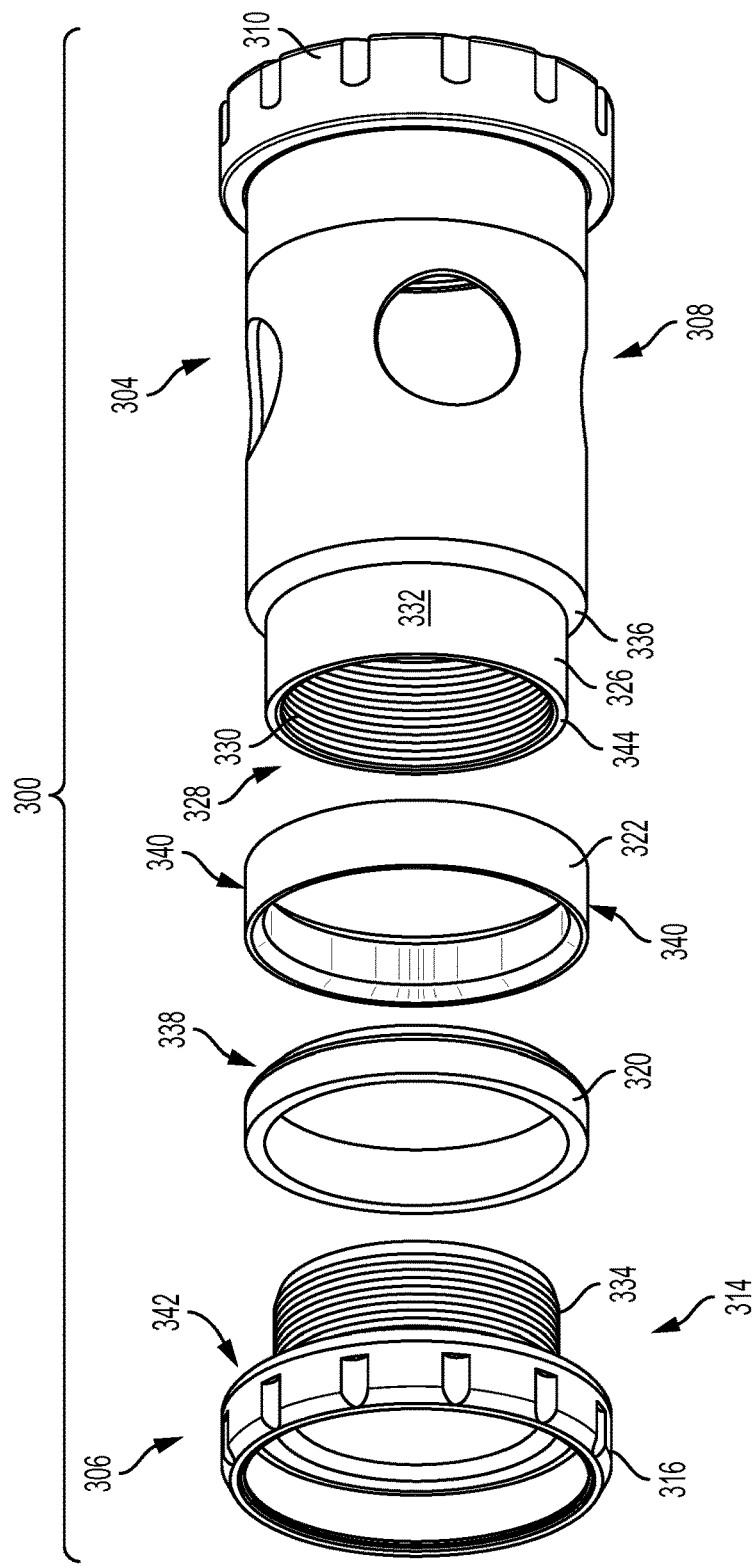
FIG. 12 is an exploded view of yet another illustrative bottom bracket, in accordance with aspects of the present disclosure.
Figure 13:
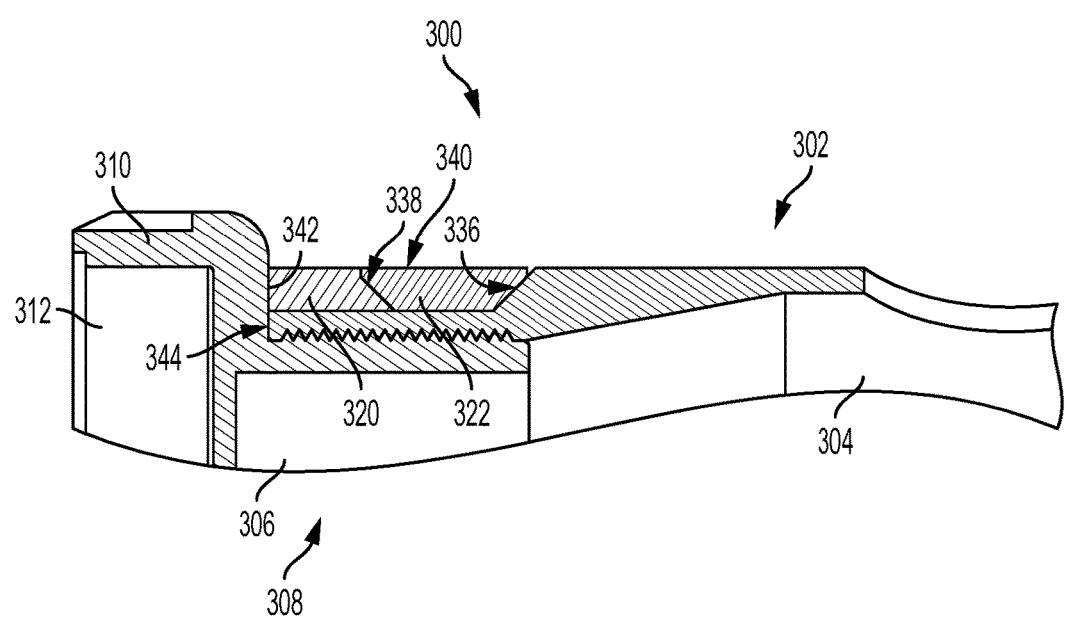
FIG. 13 is a partial, sectional elevation view of the bottom bracket of FIG. 12, as assembled.

As shown in FIGS. 12-13, this section describes another illustrative bottom bracket (BB) 300 having an expandable ring portion. BB 300 is an example of the bottom bracket described generally above, and is similar to bottom brackets 100 and 200. BB 300 may be referred to as a bottom bracket system.

BB 300 is functionally similar to BB 100 and BB 200, and includes many substantially similar elements. FIG. 12 is an exploded view of BB 300. FIG. 13 is a partial, sectional elevation view of BB 300, as assembled.

As shown in FIGS. 12 and 13, BB 300 includes a LH cup 304 and a RH cup 306 that may be threaded together, similar to the threaded cups described above with respect to BB 100 and BB 200. As described with respect to BB 100 and BB 200, LH cup 304 includes a LH mounting portion 308 and a LH bearing housing 310 for housing a LH bearing 312. Similarly, RH cup 306 includes a RH mounting portion 314 and a RH bearing housing 316 for housing a RH bearing (not depicted). A sleeve 320 and a resilient O-ring 322 are also provided, substantially as described above with respect to BB 100 and BB 200. In this example, O-ring 322 has a trapezoidal cross section. When threaded together, LH mounting portion 308 and RH mounting portion 314 collectively form a body portion 302 of BB 200 between the bearing housings.

BB 300 includes a cylindrical portion 326 at a distal end 328 of LH mounting portion 308. Cylindrical portion 326 has an internal threaded surface 330 and an exterior unthreaded surface 332. Similar to BB 200, sleeve 320 and O-ring 322 are disposed on unthreaded surface 332 of the LH cup, and an exterior threaded portion 334 of RH cup 306 mates with threaded surface 330. Threading the two cups together causes axial force to be applied to O-ring 322 as it is impinged by sleeve 320 and a first annular abutment 336 of LH cup 304. An inboard side edge 338 of sleeve 320 has a wedge shape (i.e., an angled surface). Similarly, annular abutment 336 has an opposing wedge shape (i.e., an opposing angled surface). Accordingly, applying axial force to O-ring 322 comprises applying a wedging force, as the sleeve and annular abutment 336 wedge under the trapezoid-shaped O-ring and cause it to expand radially outward. As with other examples, OD 340 therefore becomes greater than the OD of body portion 302, or at least attempts such an expansion (as limited by an adjacent bottom bracket shell).

In this example, threading the cups together causes ring portion 322 to be forced radially outward. Ring portion 322 may be resilient, such that expansion of the ring portion is reversible upon release. Angled surface 338 of wedge sleeve 320 may cooperate with angled abutment 336 of LH cup 304 to expand ring portion 322 by moving the angled surfaces toward each other as the cups are threaded together. The expanded ring portion will press against the inner surface of the BB shell, thereby locking the BB in place. Conversely, the wedge sleeve and LH cup may move apart as the cups are separated, allowing the ring portion to return to its standard diameter.

In this example, sleeve 320 is disposed between O-ring 322 and a second annular abutment 342 on RH cup 306. Threaded engagement of the cups may be arrested by a distal lip 344 of LH cup 304 abutting against abutment 342, as shown in the drawings. In BB 300, coaxial alignment of the cups is maintained by the threaded portions when assembled together.

C. Illustrative Method

Figure 14:
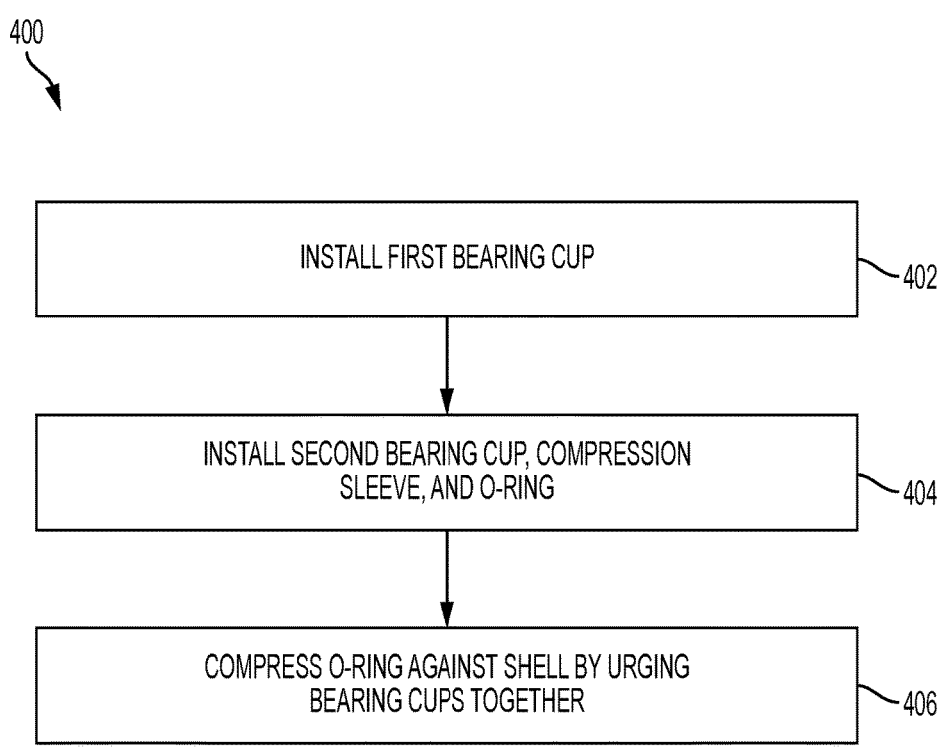
FIG. 14 is a flowchart depicting steps in an illustrative method for installing a bottom bracket in a bicycle frame in accordance with aspects of the present disclosure.

This section describes an illustrative method for installing a bottom bracket in a bicycle frame according to the present teachings; see FIG. 14. Aspects of devices and systems described above may be utilized in the method steps described below. Where appropriate, reference may be made to previously described components and systems that may be used in carrying out each step. These references are for illustration, and are not intended to limit the possible ways of carrying out any particular step of the method.

FIG. 14 is a flowchart illustrating steps performed in an illustrative method, and may not recite the complete process or all steps of the process. FIG. 14 depicts multiple steps of a method, generally indicated at 400, which may be performed in conjunction with improved bottom brackets according to aspects of the present disclosure. Although various steps of method 400 are described below and depicted in FIG. 14, the steps need not necessarily all be performed, and in some cases may be performed in a different order than the order shown. Additionally, steps of method 400 may be combined with one or more method steps described herein.

Step 402 includes mounting a first bearing cup in a first side portion of a bottom bracket shell of the bicycle frame by pressing the first bearing cup into the bottom bracket shell. The first bearing cup may have an outer diameter that generally conforms to an inner diameter of the bottom bracket shell. In some examples, the first bearing cup may be generally cylindrical. In some examples, the first bearing cup includes a first bearing housing, which may be an exterior bearing housing having an outer diameter larger than the bottom bracket shell. LH bearing cup 104, and RH bearing cups 206 and 306 are examples of first bearing cups suitable for use in step 402.

Step 404 includes mounting a second bearing cup in a second side portion of the bottom bracket shell, the second bearing cup having an annular sleeve (e.g., sleeve 120, 220, or 320) and a resilient O-ring (e.g., ring 122, 222, or 322) coaxially disposed thereon. The second bearing cup may have an outer diameter that generally conforms to an inner diameter of the bottom bracket shell. In some examples, the second bearing cup may be generally cylindrical. In some examples, the second bearing cup includes a second bearing housing, which may be an exterior bearing housing having an outer diameter larger than the bottom bracket shell. RH bearing cup 106, and LH bearing cups 204 and 304 are examples of second bearing cups suitable for use in step 404.

Step 406 includes applying an axial force to the resilient O-ring by urging the first bearing cup and second bearing cup closer together. Applying axial force may include compression and/or wedging of the O-ring. Applying the axial force to the resilient O-ring causes the O-ring to expand against an inner surface of the bottom bracket shell. Urging the first bearing cup and second bearing cup closer together may include causing respective threaded portions of the bearing cups to mate together. In some examples, threaded mating may continue until a mechanical stop is reached. In some examples, reaching the mechanical stop may coincide with reaching a desired expansion of the resilient O-ring. In some examples, reaching the mechanical stop may coincide with reaching a desired bottom bracket width corresponding to a width of the bottom bracket shell.

Additional Examples and Illustrative Combinations

This section describes additional aspects and features of bicycle bottom brackets according to the present teachings, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A bottom bracket for a bicycle, the bottom bracket comprising: a left bearing cup including a left bearing housing at a left end and a first threaded portion at a right end; a right bearing cup including a right bearing housing at a right end and a second threaded portion at a left end, the second threaded portion engaged with the first threaded portion such that the left bearing housing is coaxially aligned with the right bearing housing; the left bearing cup and the right bearing cup collectively defining a bottom bracket having a body portion extending between the left bearing housing and the right bearing housing, the body portion having a maximum outer diameter; the left bearing cup including a first annular abutment and the right bearing cup including an opposite-facing second annular abutment; and a resilient ring substantially coaxial with the left and right bearing cups and disposed intermediate the first annular abutment and the second annular abutment; wherein the bottom bracket is transitionable between: a first configuration, in which the resilient ring has a first outer diameter and the first annular abutment is spaced from the second annular abutment by a first distance, and a second configuration, in which the first annular abutment is spaced from the second annular abutment by a second distance smaller than the first distance and an axial force is applied to the resilient ring such that at least a portion of the resilient ring is expanded radially outward to a second outer diameter greater than the maximum outer diameter of the body portion of the bottom bracket.

A1. The bottom bracket of A0, wherein the axial force is a squeezing force configured to compress the resilient ring axially while expanding the resilient ring radially.

A2. The bottom bracket of A0, wherein the axial force is a wedging force.

A3. The bottom bracket of A2, wherein the wedging force is configured to expand the entire resilient ring radially outward.

A4. The bottom bracket of any one of paragraphs A0 through A3, further comprising a sleeve disposed adjacent to the resilient ring.

A5. The bottom bracket of A4, wherein the sleeve is disposed intermediate the resilient ring and the second annular abutment of the right bearing cup.

A6. The bottom bracket of A4, wherein respective axial faces of the resilient ring, the sleeve, the first annular abutment, and the second annular abutment are substantially planar and substantially orthogonal to a long axis of the bottom bracket.

A7. The bottom bracket of A4, wherein the left bearing cup and the right bearing cup comprise a same first material, and the sleeve comprises a different second material.

A8. The bottom bracket of A7, wherein the sleeve comprises a plastic.

A9. The bottom bracket of any one of paragraphs A0 through A8, further comprising a bottom bracket shell peripherally surrounding the body portion of the bottom bracket, wherein the resilient ring applies a radial force to an inner wall of the shell when the bottom bracket is in the second configuration.

A10. A bicycle comprising the bottom bracket shell and bottom bracket of A9.

B0. A bicycle bottom bracket comprising: a bottom bracket shell having an inner wall; a first bearing cup including a first threaded portion; a second bearing cup including a second threaded portion mated with the first threaded portion to couple the first and second bearing cups in a generally coaxial alignment within the bottom bracket shell; a first member having a first surface coupled to and movable with the first bearing cup; a second member having a second surface coupled to and movable with the second bearing cup; and a resilient annulus disposed on an outer surface of the first bearing cup, between the first and second surfaces; wherein coupling the first and second bearing cups is configured to bring the first and second surfaces toward each other, compressing the resilient annulus and expanding at least a portion of the resilient annulus radially outward against the inner wall of the bottom bracket shell.

B1. The bottom bracket of B0, wherein the first member comprises a sleeve separate from and disposed on the first bearing cup.

B2. The bottom bracket of B1, wherein the sleeve comprises plastic.

B3. The bottom bracket of any one of paragraphs B0 through B2, wherein the second member is unitary with the second bearing cup.

B4. The bottom bracket of any one of paragraphs B0 through B3, wherein the first bearing cup is a right side bearing cup.

B5. The bottom bracket of any one of paragraphs B0 through B4, wherein the resilient annulus is a rubber ring.

C0. A method of installing a bottom bracket in a bicycle frame, the method comprising: mounting a left bearing cup in a left side portion of a bottom bracket shell of a bicycle frame by pressing the left bearing cup into the bottom bracket shell; mounting a right bearing cup in a right side portion of the bottom bracket shell, the right bearing cup having an annular compression sleeve and a resilient ring coaxially disposed thereon; and compressing the resilient ring by urging the left bearing cup and right bearing cup closer together; wherein compressing the resilient ring causes at least a portion of the resilient ring to expand against an inner surface of the bottom bracket shell.

C1. The method of C0, wherein urging the left bearing cup and right bearing cup closer together includes causing respective threaded portions of the bearing cups to mate together.

C2. The method of C1, wherein the respective threaded portions of the bearing cups are caused to mate together until a mechanical stop is reached.

C3. The method of C2, wherein reaching the mechanical stop coincides with reaching a selected expansion of the resilient ring configured to lock the bottom bracket into the bottom bracket shell.

C4. The method of C2, wherein reaching the mechanical stop coincides with reaching a bottom bracket width corresponding to a width of the bottom bracket shell.

D0. A method of installing a bottom bracket in a bicycle frame, the method comprising: mounting a left bearing cup in a left side portion of a bottom bracket shell of a bicycle frame by pressing the left bearing cup into the bottom bracket shell; mounting a right bearing cup in a right side portion of the bottom bracket shell, the right bearing cup having an annular sleeve and a resilient ring coaxially disposed thereon; and impinging on the resilient ring by urging the left bearing cup and right bearing cup closer together; wherein impinging on the resilient ring causes at least a portion of the resilient ring to expand against an inner surface of the bottom bracket shell.

D1. The method of D0, wherein impinging on the resilient ring comprises compressing the resilient ring in an axial direction using the annular sleeve.

D2. The method of any one of paragraphs D0 through D1, wherein impinging on the resilient ring comprises urging the resilient ring radially outward using a wedge surface of the annular sleeve.

D3. The method of any one of paragraphs D0 through D2, wherein urging the left bearing cup and right bearing cup closer together includes causing respective threaded portions of the bearing cups to mate together.

D4. The method of D3, wherein the respective threaded portions of the bearing cups are caused to mate together until a mechanical stop is reached.

D5. The method of D4, wherein reaching the mechanical stop coincides with reaching a selected expansion of the resilient ring configured to lock the bottom bracket into the bottom bracket shell.

D6. The method of D4, wherein reaching the mechanical stop coincides with reaching a bottom bracket width corresponding to a width of the bottom bracket shell.

Advantages, Features, Benefits

The different embodiments and examples of the bottom brackets and related methods described herein provide several advantages over known solutions. For example, illustrative embodiments and examples described herein can be used and adapted to work with bicycle frames having a larger tolerance in the bottom bracket bore, and can be used with a wider array of standard sizes of bottom bracket.

Additionally, and among other benefits, illustrative embodiments and examples described herein provide a softer contact with the bicycle frame (i.e., using a resilient ring rather than metal components), resulting in a decreased likelihood of frame damage.

Additionally, and among other benefits, illustrative embodiments and examples described herein provide improved securement of the bottom bracket bearing cups within the bottom bracket shell.

Additionally, and among other benefits, illustrative embodiments and examples described herein reduce the potential for undesired creaking of the bottom bracket, due at least in part to the material properties of the resilient ring as compared with known metal bottom bracket solutions.

Additionally, and among other benefits, illustrative embodiments and examples described herein provide improved ease of manufacturing, with a corresponding reduction in cost.

Additionally, and among other benefits, illustrative embodiments and examples described herein provides a gradual increase in the amount of force required to bottom out the cup, providing better feedback to the installer than, for example, with the discrete change of a collet design.

No known system or device can provide these benefits. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A bottom bracket for a bicycle, the bottom bracket comprising:
  a left bearing cup including a left bearing housing at a left end and a first threaded portion at a right end;
  a right bearing cup including a right bearing housing at a right end and a second threaded portion at a left end, the second threaded portion engaged with the first threaded portion such that the left bearing housing is coaxially aligned with the right bearing housing;
  the left bearing cup and the right bearing cup collectively defining a bottom bracket having a body portion extending between the left bearing housing and the right bearing housing, the body portion having a maximum outer diameter;
  the left bearing cup including a first annular abutment and the right bearing cup including an opposite-facing second annular abutment; and
  a resilient ring substantially coaxial with the left and right bearing cups and disposed intermediate the first annular abutment and the second annular abutment;
  wherein the bottom bracket is transitionable between:
    a first configuration, in which the resilient ring has a first outer diameter and the first annular abutment is spaced from the second annular abutment by a first distance, and
    a second configuration, in which the first annular abutment is spaced from the second annular abutment by a second distance smaller than the first distance and an axial force is applied to the resilient ring such that at least a portion of the resilient ring is expanded radially outward to a second outer diameter greater than the maximum outer diameter of the body portion of the bottom bracket.

2. The bottom bracket of claim 1, wherein the axial force is a squeezing force configured to compress the resilient ring axially while expanding the resilient ring radially.

3. The bottom bracket of claim 1, wherein the axial force is a wedging force configured to expand the entire resilient ring radially outward.

4. The bottom bracket of claim 1, further comprising a sleeve disposed adjacent to the resilient ring.

5. The bottom bracket of claim 4, wherein the sleeve is disposed intermediate the resilient ring and the second annular abutment of the right bearing cup.

6. The bottom bracket of claim 4, wherein respective axial faces of the resilient ring, the sleeve, the first annular abutment, and the second annular abutment are substantially planar and substantially orthogonal to a long axis of the bottom bracket.

7. The bottom bracket of claim 4, wherein the left bearing cup and the right bearing cup comprise a same first material, and the sleeve comprises a different second material.

8. The bottom bracket of claim 7, wherein the sleeve comprises a plastic.

9. The bottom bracket of claim 1, further comprising a bottom bracket shell peripherally surrounding the body portion of the bottom bracket, wherein the resilient ring applies a radial force to an inner wall of the shell when the bottom bracket is in the second configuration.

10. A bicycle comprising the bottom bracket shell and the bottom bracket of claim 9.

11. A bicycle bottom bracket comprising:
a bottom bracket shell having an inner wall;
a first bearing cup including a first threaded portion;
a second bearing cup including a second threaded portion mated with the first threaded portion to couple the first and second bearing cups in a generally coaxial alignment within the bottom bracket shell;
a first member having a first surface coupled to and movable with the first bearing cup;
a second member having a second surface coupled to and movable with the second bearing cup; and
a resilient annulus disposed on an outer surface of the first bearing cup, between the first and second surfaces;
wherein coupling the first and second bearing cups is configured to bring the first and second surfaces toward each other, compressing the resilient annulus and expanding at least a portion of the resilient annulus radially outward against the inner wall of the bottom bracket shell.

12. The bottom bracket of claim 11, wherein the first member comprises a sleeve separate from and disposed on the first bearing cup.

13. The bottom bracket of claim 11, wherein the second member is unitary with the second bearing cup.

14. The bottom bracket of claim 11, wherein the first bearing cup is a right side bearing cup.

15. The bottom bracket of claim 11, wherein the resilient annulus is a rubber ring.

16. A method of installing a bottom bracket in a bicycle frame, the method comprising:
mounting a left bearing cup in a left side portion of a bottom bracket shell of a bicycle frame by pressing the left bearing cup into the bottom bracket shell;
mounting a right bearing cup in a right side portion of the bottom bracket shell, the right bearing cup having an annular sleeve and a resilient ring coaxially disposed thereon; and
impinging on the resilient ring by urging the left bearing cup and right bearing cup closer together;
wherein impinging on the resilient ring causes at least a portion of the resilient ring to expand against an inner surface of the bottom bracket shell.

17. The method of claim 16, wherein impinging on the resilient ring comprises compressing the resilient ring in an axial direction using the annular sleeve.

18. The method of claim 16, wherein impinging on the resilient ring comprises urging the resilient ring radially outward using a wedge surface of the annular sleeve.

19. The method of claim 16, wherein urging the left bearing cup and right bearing cup closer together includes causing respective threaded portions of the right and left bearing cups to mate together.

20. The method of claim 19, wherein the respective threaded portions of the right and left bearing cups are caused to mate together until a mechanical stop is reached, and wherein reaching the mechanical stop coincides with reaching a selected expansion of the resilient ring configured to lock the bottom bracket into the bottom bracket shell.

* * * * *